United States Patent
Nagao

(10) Patent No.: US 9,778,763 B2
(45) Date of Patent: Oct. 3, 2017

(54) IMAGE PROJECTION APPARATUS, AND SYSTEM EMPLOYING INTERACTIVE INPUT-OUTPUT CAPABILITY

(71) Applicant: Masafumi Nagao, Kanagawa (JP)

(72) Inventor: Masafumi Nagao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/955,621

(22) Filed: Dec. 1, 2015

(65) Prior Publication Data
US 2016/0162050 A1 Jun. 9, 2016

(30) Foreign Application Priority Data
Dec. 8, 2014 (JP) ................. 2014-248047

(51) Int. Cl.
*G06F 3/0354* (2013.01)
*H04N 9/31* (2006.01)
(Continued)

(52) U.S. Cl.
CPC ........ *G06F 3/03545* (2013.01); *G06F 3/0321* (2013.01); *G06F 3/0346* (2013.01); *H04N 9/31* (2013.01)

(58) Field of Classification Search
CPC .. G06F 3/0321; G06F 3/0346; G06F 3/03545; H04N 9/31
(Continued)

(56) References Cited

U.S. PATENT DOCUMENTS

| | | | |
|---|---|---|---|
| 6,766,066 B2 * | 7/2004 | Kitazawa | G06F 3/0386 345/179 |
| 2005/0270494 A1 | 12/2005 | Banning | |

(Continued)

FOREIGN PATENT DOCUMENTS

| | | |
|---|---|---|
| JP | 2004-062657 | 2/2004 |
| JP | 2012-043250 | 3/2012 |

OTHER PUBLICATIONS

Extended European Search Report issued on Apr. 19, 2016 in European Patent Application No. 15197295.7.
(Continued)

*Primary Examiner* — Dmitriy Bolotin
(74) *Attorney, Agent, or Firm* — Oblon, McClelland, Maier & Neustadt, L.L.P.

(57) ABSTRACT

An image projection apparatus includes an image receiver; an image processor; a projection unit to project a projection image on a projection screen; a coordinate calculator to calculate coordinates of a point in the projection image when the point is identified by a coordinate input device; an interactive communication unit to perform communication related to the interactive input-output capability with the coordinate input device, and the external apparatus; an operation information converter to convert the calculated coordinates of the point and an operation information of the coordinate input device to an operation information for the image projection apparatus and the external apparatus; a distance calculator to calculate distance between the coordinate input device and the projection screen; and an input-action-reproducing determination unit to determine whether movement of coordinates of the point on the projection screen identified by the coordinate input device is reproduced depending on the calculated distance.

12 Claims, 9 Drawing Sheets

(51) Int. Cl.
*G06F 3/03* (2006.01)
*G06F 3/0346* (2013.01)

(58) Field of Classification Search
USPC .......................................... 345/179
See application file for complete search history.

(56) References Cited

U.S. PATENT DOCUMENTS

| | | | | |
|---|---|---|---|---|
| 2006/0183994 A1* | 8/2006 | Murayama | ............ | G03B 21/13 600/407 |
| 2007/0013657 A1* | 1/2007 | Banning | ............... | G06F 3/0346 345/157 |
| 2007/0273646 A1* | 11/2007 | Chao | ........................ | G09G 5/08 345/157 |
| 2009/0122030 A1* | 5/2009 | Morimoto | ............ | G06F 3/0321 345/179 |
| 2010/0259474 A1* | 10/2010 | Hildreth | ................ | G06F 3/0317 345/156 |
| 2011/0227827 A1 | 9/2011 | Solomon et al. | | |
| 2013/0179871 A1 | 7/2013 | Nagao et al. | | |
| 2013/0285905 A1* | 10/2013 | Tsai | ...................... | G06F 3/0386 345/158 |
| 2014/0189674 A1 | 7/2014 | Nagao | | |
| 2014/0247214 A1* | 9/2014 | Cheng | ..................... | G06F 3/033 345/157 |
| 2015/0054745 A1* | 2/2015 | Cheng | ................... | G06F 3/0304 345/158 |
| 2015/0138512 A1 | 5/2015 | Nagao | | |
| 2015/0169085 A1* | 6/2015 | Ida | ........................ | G06F 3/005 345/156 |

OTHER PUBLICATIONS

U.S. Appl. No. 14/744,530, filed Jun. 19, 2015.
U.S. Appl. No. 14/753,447, filed Jun. 29, 2015.

* cited by examiner

| DEVICE-TO-SCREEN DISTANCE | 0 m | 0.5 m | 1.0 m | ... |
|---|---|---|---|---|
| MOVEMENT OF COORDINATE ON SCREEN | 10 pixel | 10 pixel | 10 pixel | ... |
| SWING ANGLE OF DEVICE END | - | 0.1° | 0.05° | ... |

| DEVICE-TO-SCREEN DISTANCE | 0 m | 0.5 m | 1.0 m | ... |
|---|---|---|---|---|
| SMALLEST LENGTH | 1 pixel | 3 pixel | 5 pixel | ... |

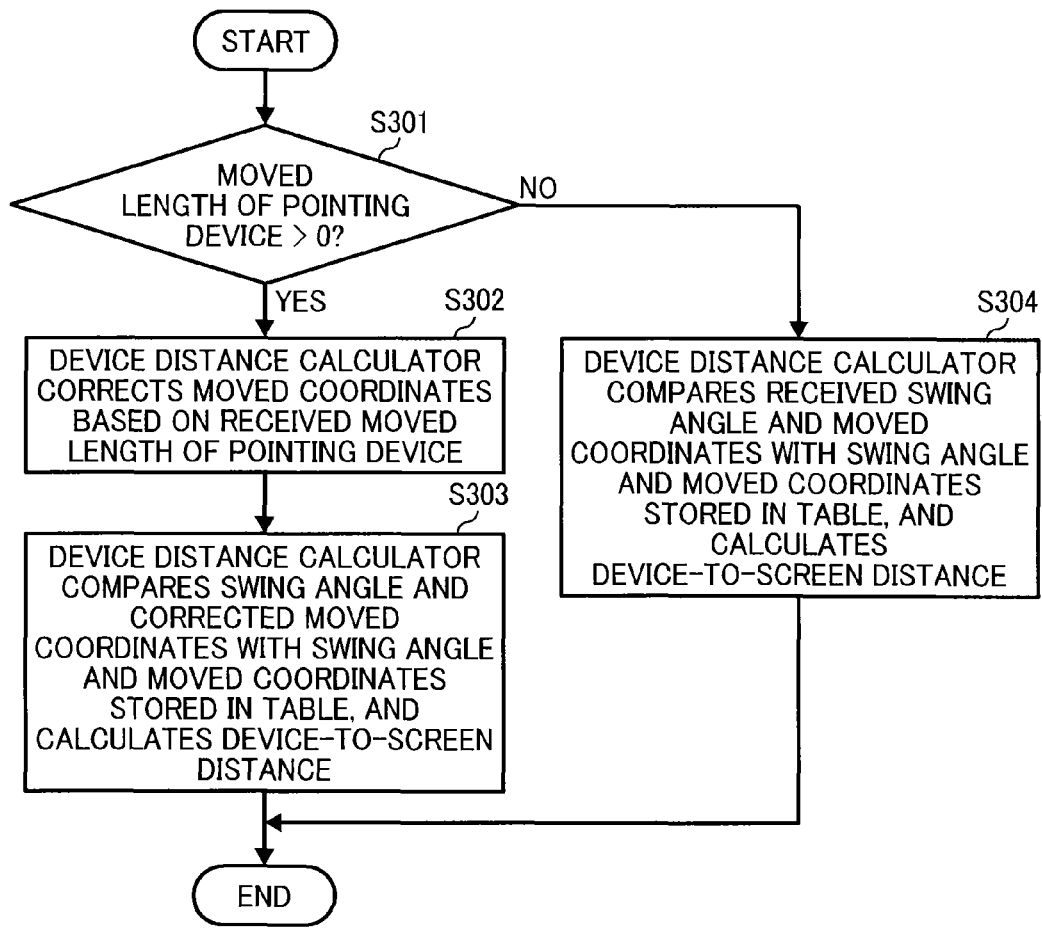

| DEVICE-TO-SCREEN DISTANCE | 0 m | 0.5 m | 1.0 m | SCREEN SIZE (80 INCHES) |
| DEVICE-TO-SCREEN DISTANCE | 0 m | 0.5 m | 1.0 m | SCREEN SIZE (100 INCHES) |
| MOVEMENT OF COORDINATE ON SCREEN | 10 pixel | 10 pixel | 10 pixel | |
| SWING ANGLE OF DEVICE END | - | 0.1° | 0.05° | |

IMAGE PROJECTION APPARATUS, AND SYSTEM EMPLOYING INTERACTIVE INPUT-OUTPUT CAPABILITY

CROSS-REFERENCE TO RELATED APPLICATION

This application claims priority pursuant to 35 U.S.C. §119(a) to Japanese Patent Application No. 2014-248047, filed on Dec. 8, 2014 in the Japan Patent Office, the disclosure of which is incorporated by reference herein in its entirety.

BACKGROUND

Technical Field

The present invention relates to an image projection apparatus, and a system employing interactive input-output capability.

Background Art

Conventional interactive input-output systems can be configured with an image projection apparatus such as a projector, a coordinate input device such as an electronic pen or finger, and an information processing apparatus such as a computer used as an external apparatus. In the interactive input-output systems, a user can draw images (e.g., line, character, text, figure) on a projection screen used for projecting images from the image projection apparatus by using the coordinate input device, and can operate the external apparatus such as the information processing apparatus that transmits image signals by using the coordinate input device on the projection screen. Specifically, a camera is used to calculate or detect coordinates of a point identified or pointed by the coordinate input device on the projection screen. Based on the calculated coordinates of the point pointed by the coordinate input device, the external apparatus such as the information processing apparatus coupled or connected with the image projection apparatus by a communication cable (e.g., USB cable) and a network is operated.

Conventional image projection apparatuses such as rear projection apparatuses employ the following interactive input-output capability, in which the image projection apparatus is coupled or connected to an external apparatus. When the image projection apparatus is projecting an image on a projection screen such as a wall or white board, a coordinate input device such as a pen can be moved while contacting to the projection screen or not contacting the projection screen, and then based on coordinates of a trajectory of the moved pen, the external apparatus can be operated, or an image can be drawn on the projection screen by using the external apparatus.

As to this image projection apparatus, a plurality of sensors is disposed near the projection screen to calculate distance between the projection screen and the coordinate input device to calculate or detect a point of the coordinate input device relative to the projection screen. When the coordinate input device is operated without touching the projection screen, an image of coordinates pointed by the coordinate input device can be enlarged so that a user (operator) can see a point of the coordinates. With this enlarged condition, even if a movement of the coordinate input device is small, the external apparatus can be operated, or an image can be drawn on the projection screen by using the external apparatus.

However, different from a case that the user operates the coordinate input device by contacting the coordinate input device on the projection screen, when the user operates the coordinate input device without touching the coordinate input device to the projection screen, the user operates the coordinate input device in the space. Therefore, when the user's hand shakes, coordinates input by the coordinate input device becomes unstable and fluctuates. If the coordinates input becomes unstable and fluctuates, coordinates of points on the projection screen cannot be input correctly, which means that coordinates of points matched to the user-intended operation cannot be input, in which the coordinate input error occurs, and thereby the external apparatus cannot be operated, or clear and sharp lines and figures cannot be drawn on the projection screen by using the external apparatus.

Further, when to draw clear and sharp images (e.g., line, character, text, figure) matched to the user-intended operation by using the external apparatus, small or fine movement of the coordinate input device is required to be reproduced on the projection screen, but the coordinate input error may become greater when the user operates the coordinate input device without touching the coordinate input device to the projection screen. Therefore, the clear and sharp images matched to the user-intended operation cannot be generated but unclear and not-sharp images are generated.

SUMMARY

As to one aspect of the present invention, an image projection apparatus is devised. The image projection apparatus is configurable with a coordinate input device and an external apparatus, and each has interactive input-output capability. The image projection apparatus includes an image receiver to receive an image signal; an image processor to convert the image signal received by the image receiver to a projection signal; a projection unit to project a projection image on a projection screen using the projection signal; a coordinate calculator to calculate coordinates of a point in the projection image on the projection screen when the point is identified by a coordinate input device and information of coordinates of the identified point is input from the coordinate input device to the image projection apparatus; an interactive communication unit to perform communication of information related to the interactive input-output capability with the coordinate input device, and the external apparatus that outputs the image signal to the image receiver; an operation information converter to convert the coordinates of the point calculated by the coordinate calculator and an operation information of the operation button of the coordinate input device to an operation information used for any one of the image projection apparatus and the external apparatus; a distance calculator to calculate distance between the coordinate input device and the projection screen; and an input-action-reproducing determination unit to determine whether movement of coordinates of the point on the projection screen identified by the coordinate input device is to be reproduced on the projection screen depending on the distance calculated by the distance calculator.

As to another aspect of the present invention, a system employing an interactive input-output capability is devised. The system employing includes the above image projection apparatus to project an projection image on a projection screen; a coordinate input device to input coordinates of a point in the projection image projected on the projection screen by the image projection apparatus; and an external apparatus to output an image signal used for generating the projection image projected by the image projection apparatus. The image projection apparatus includes an interactive input-output capability to operate the external apparatus based on the coordinates of the point pointed by the coordinate input device contacting the projection screen or pointed by the coordinate input device not contacting the projection screen. The coordinate input device includes an interactive communication unit to perform communication of information related to the interactive input-output capability with the image projection apparatus; a positional information measurement unit to measure a pattern information embedded in the projection image by using the coordinate input device, and transmit the measured information to the image projection apparatus via the interactive communication unit; a moved length calculator to calculate a moved length of the coordinate input device based on acceleration occurred by an operational movement of the coordinate input device; and an angle calculator to calculate a swing angle of the coordinate input device based on an angular velocity occurred by a postural change of the coordinate input device. The external apparatus includes an interactive communication unit to perform communication of information related to the interactive input-output capability with the image projection apparatus; an image output unit to output an image signal to the image projection apparatus and a display disposed for the external apparatus; and an operation unit to perform an operation on the external apparatus based on the operation information received via the interactive communication unit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 11 is a flow chart showing the steps of calculating distance between the pointing device and the projection screen by using the device distance calculator 126 based on the postural change of the pointing device and the moved length of the pointing device;

FIG. 12 is an example of a table having a data configuration that sets the smallest length for re-producing an operation of the pointing device for one user;

FIG. 13 is an example of a table having data configuration that sets the smallest length differently whether the pointing device is in an instruction mode or a writing mode;

Figure 1:
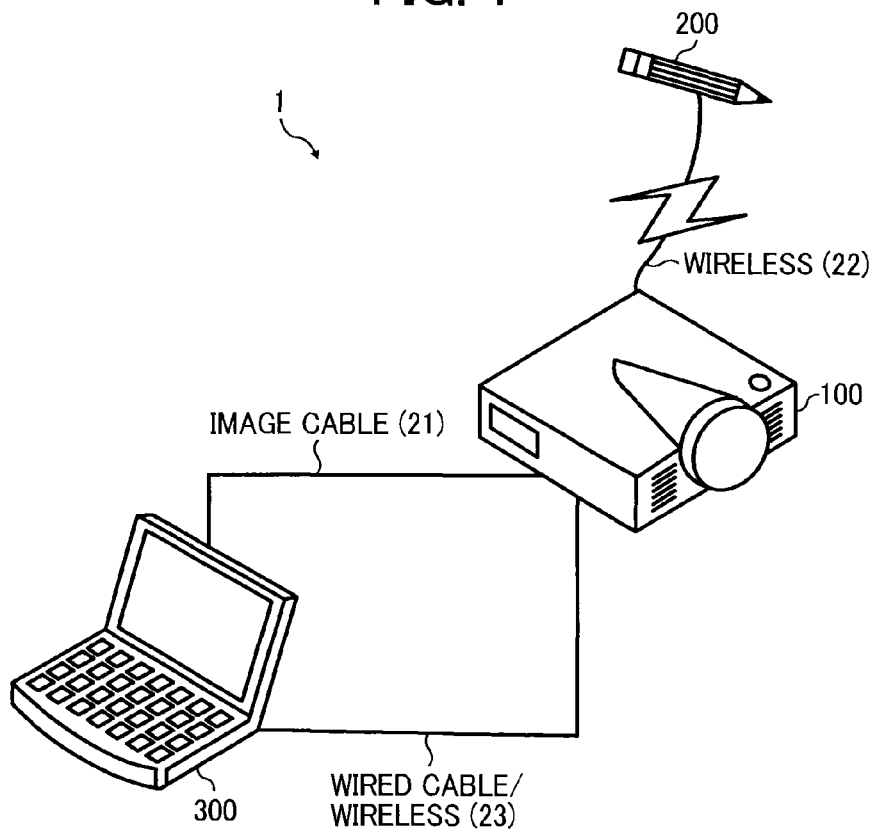
FIG. 1 is a schematic configuration of an image projection system employing an image projection apparatus according to one or more example embodiments of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments are described hereinafter.

A description is given of an image projection system (or image display system) according to one or more example embodiments of the present invention with reference to drawings. The image projection system can be configured with an image projection apparatus such as a projector (hereinafter, image projection apparatus 100) having an interactive input-output capability or interactive operational capability, and other apparatus having an interactive input-output capability or interactive operational capability. An interactive input-output system or interactive operational system having the interactive input-output capability can be applied to the image projection system (or image display system) according to one or more example embodiments of the present invention.

Figure 2:
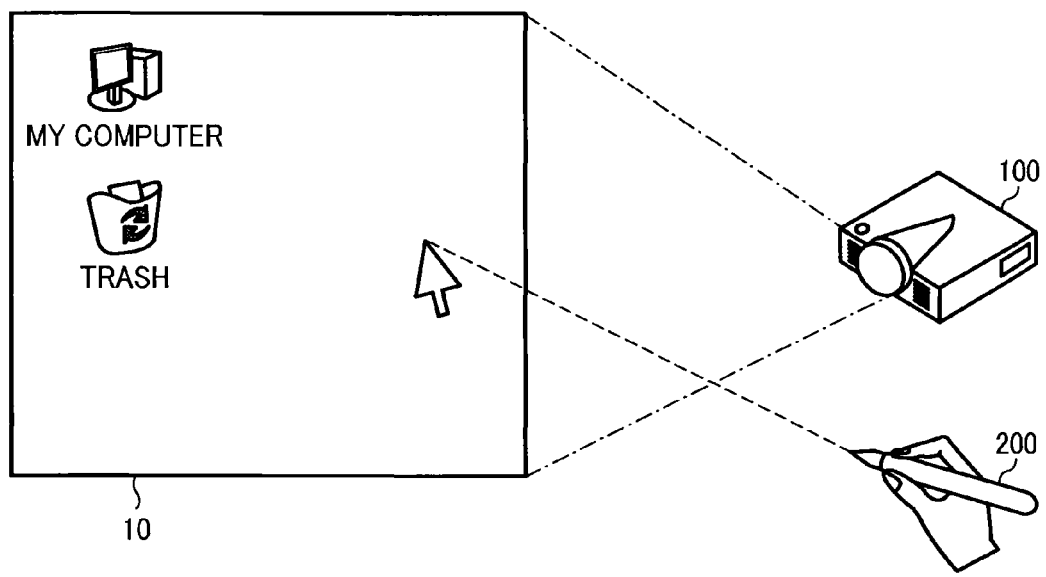
FIG. 2 is a schematic operational configuration of the image projection system when a pointing device is operated without touching a projection screen.

A description is given of a configuration and operation of the image projection system according to one or more example embodiments of the present invention with reference to drawings. FIG. 1 is a schematic configuration of an image projection system 1 employing an image projection apparatus 100 according to one or more example embodiments of the present invention. FIG. 2 is a schematic operational configuration of the image projection system 1 when a pointing device is operated without touching a projection screen 10.

As illustrated in FIG. 1, the image projection system 1 can be configured with, for example, the image projection apparatus 100 such as a projector, an information processing apparatus 300 used as an external apparatus that can input image information to be projected by the image projection apparatus 100, and a pointing device 200 such as an electronic pen used as a coordinate input device. For example, the pointing device 200 and the image projection apparatus 100 can be coupled by wireless 22, and the information processing apparatus 300 and the image projection apparatus 100 can be coupled by an image cable 21 (e.g., HDMI cable), and a USB wired cable/wireless 23.

As illustrated in FIG. 2, when a point on the projection screen 10 pointed by a front end of the pointing device 200 from a remote point, the image projection apparatus 100 can transmit information of the point pointed by the pointing device 200 to the information processing apparatus 300 via the image cable 21, and an image processing can be performed at a point on a display monitor of the information processing apparatus 300 corresponding to the pointed point on the projection screen 10 as required, with which a cursor can be displayed on the display monitor of the information processing apparatus 300, and operated.

Figure 3:
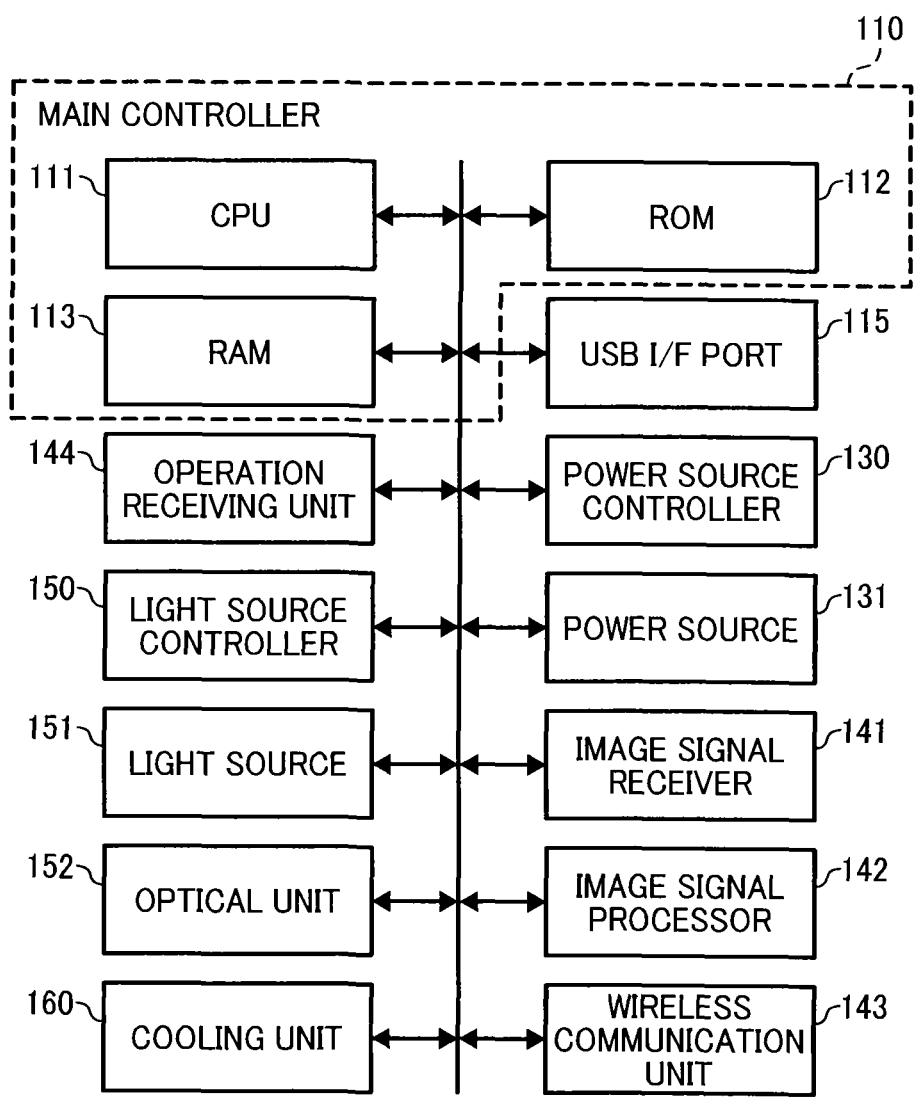
FIG. 3 is an example of a hardware configuration of the image projection apparatus.

A description is given of an example of a hardware configuration of the image projection apparatus 100 with reference to FIG. 3. As illustrated in FIG. 3, the image projection apparatus 100 includes, for example, a main controller 110. The main controller 110 includes, for example, a central processing unit (CPU) 111 used as a central processor or circuitry, a read only memory (ROM) 112 used as a non-volatile memory, and a random access memory (RAM) 113 used as a volatile memory. The CPU 111 executes programs to control operations of the image projection apparatus 100. The ROM 112 stores programs to be executed by the CPU 111 and data required for executing programs. The RAM 113 is used as a working area of the CPU 111.

The image projection apparatus 100 further includes, for example, a universal serial bus (USB) interface (I/F) port 115, a power source controller 130, a power source 131, an image signal receiver 141, an image signal processor 142, a wireless communication unit 143, an operation receiving unit 144, a light source controller 150, a light source 151, an optical unit 152, and a cooling unit 160, which are coupled or connected to the main controller 110. The USB I/F port 115 is used as a connector of a USB cable connected to the external apparatus 300. The power source controller 130 controls the power source 131. The power source 131 is used to supply power to each of the units in the image projection apparatus 100. The image signal receiver 141 has a plurality of image signal ports used for each type of images (e.g. D-Sub, HDMI, video). The image signal processor 142 receives image signals from the plurality of image signal ports, and processes the image signals. The wireless communication unit 143 receives measured information from the pointing device 200, or communicates (transmits and receives) information related to the interactive input-output capability (hereinafter, interactive communication information, or interactive communication capability information) with the information processing apparatus 300.

The operation receiving unit 144 has, for example, operation keys, to receive an operation of a user or operator. The light source controller 150 controls the light source 151. The light source 151 is used as a light source to emit light for projecting images. The optical unit 152 generates an image, and projects the enlarged image. The optical unit 152 includes a projection lens. In digital light processing (DLP: registered trademark) projector, the optical unit 152 includes a digital mirror device (DMD) and a color wheel. The cooling unit 160 such as a fan cools parts disposed inside the image projection apparatus 100.

Figure 4:
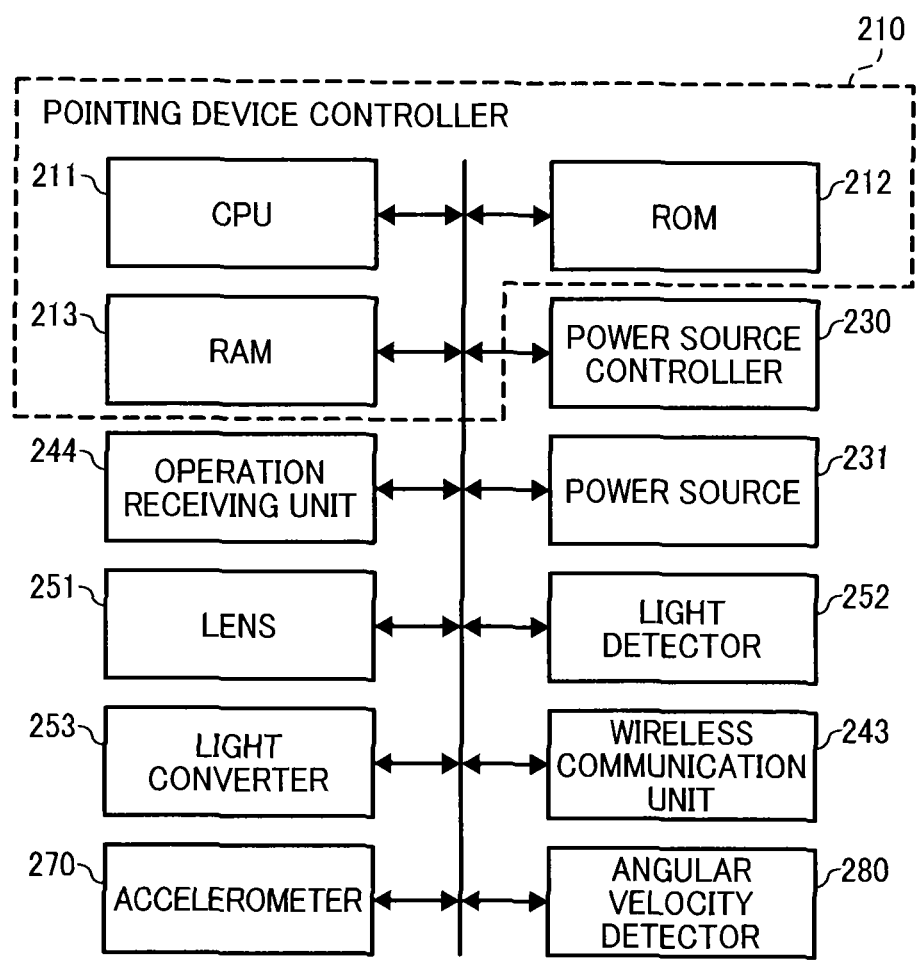
FIG. 4 is an example of a hardware configuration of the pointing device.

A description is given of a hardware configuration of the pointing device 200 with reference to FIG. 4. FIG. 4 is an example of a hardware configuration of the pointing device 200. The pointing device 200 includes, for example, an electronic pointing device controller 210. The electronic pointing device controller 210 may be also referred to the pointing device controller 210 or the device controller 210. The pointing device controller 210 includes, for example, a central processing unit (CPU) 211 used as a central processor or circuitry, a read only memory (ROM) 212 used as a non-volatile memory, and a random access memory (RAM) 213 used as a volatile memory. The CPU 211 executes programs to control operations of the pointing device 200. The ROM 212 stores programs to be executed by the CPU 211 and data required for executing programs. The RAM 213 is used as a working area of the CPU 211.

The pointing device 200 further includes a power source controller 230, a power source 231, a wireless communication unit 243, an operation receiving unit 244, a lens 251, a light detector 252, a light converter 253, an accelerometer 270, and an angular velocity detector 280, which are coupled or connected to the electronic pointing device controller 210. The power source controller 230 controls the power source 231. The power source 231 is used to supply power to each of the units in the pointing device 200. The operation receiving unit 244 has, for example, an operation button, to receive an operation of a user (or operator).

The lens 251 is disposed near a device end of the pointing device 200 to refract light to converge the light. The optical axis of the lens 251 is set parallel to the axis of the pointing device 200 having a cylinder shape. The light detector 252 has a sensor to receive the light converged by the lens 251. The light converter 253 converts the light received by the light detector 252 to electronic signals. The wireless communication unit 243 communicates (i.e., transmits and receives) information related to interactive communication information with the image projection apparatus 100. The accelerometer 270 calculates acceleration of the pointing device 200. The angular velocity detector 280 calculates angular velocity of the pointing device 200.

Figure 5:
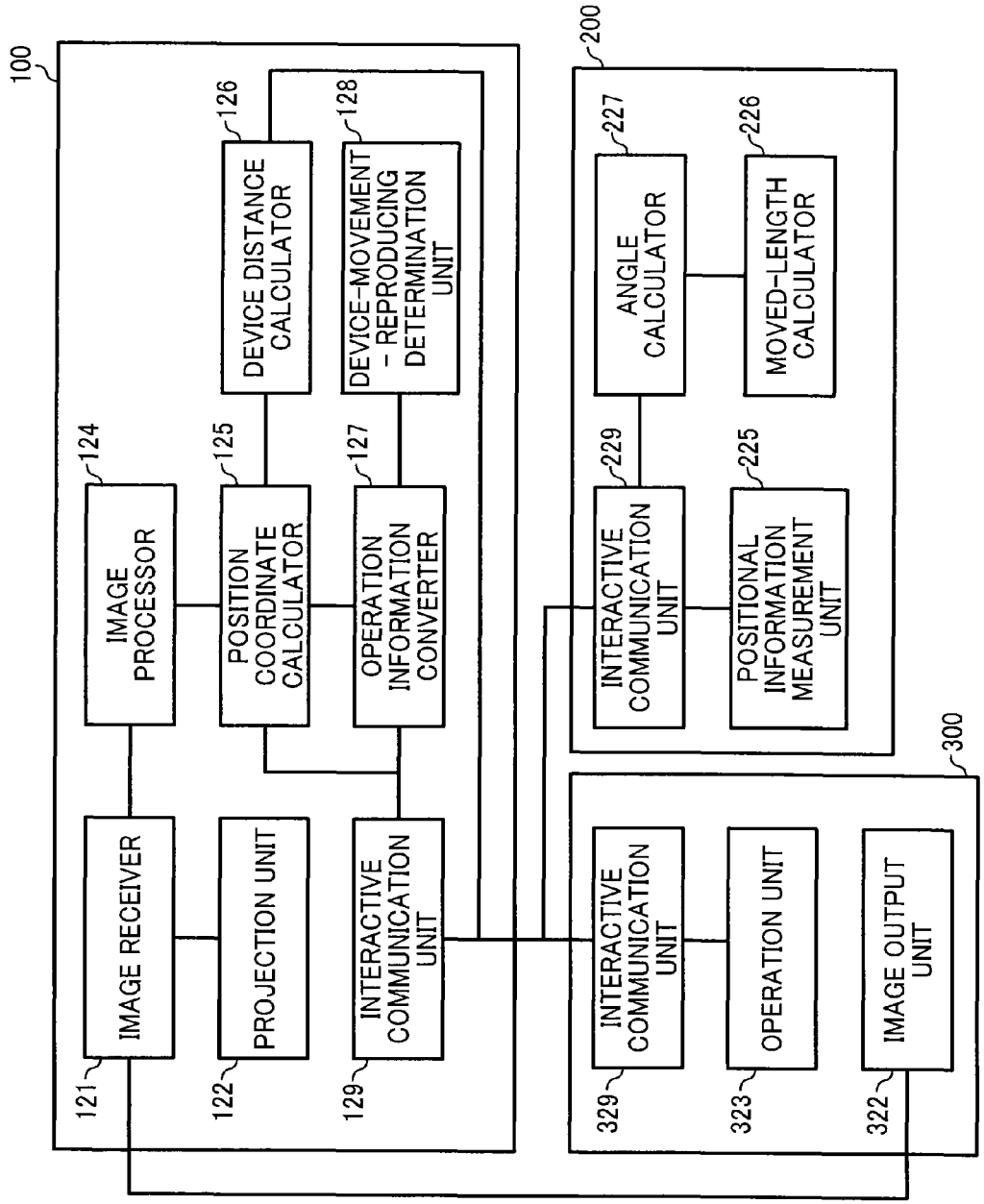
FIG. 5 is an example of a functional block diagram of the image projection system.

A description is given of functional units of the image projection apparatus 100, the information processing apparatus 300, and the pointing device 200 employed for the image projection system 1 with reference to drawings. FIG. 5 is an example of a functional block diagram of the image projection system 1.

(Image Projection Apparatus)

As illustrated in FIG. 5, the image projection apparatus 100 includes, for example, an image receiver 121, an image processor 124, a projection unit 122, a position coordinate calculator 125, an interactive communication unit 129, an operation information converter 127, a device distance calculator 126, and a device-action-reproducing determination unit 128. The image receiver 121 receives an image signal input via the image cable 21 of HDMI and VGA, and a network. The image processor 124 processes the image signal received via the image receiver 121. For example, the image processor 124 edits the image signal such as size change of an image to be projected, and performs processing to synthesize a pattern information in the image signal to convert the image signal to a projection signal, in which the image signal synthesized with the pattern information is to be used for measuring coordinates of a point pointed by the pointing device 200 on the projection screen 10 to be described later. The projection unit 122 projects an image based on the projection signal generated by the image processor 124 to an outside of the image projection apparatus 100 such as the projection screen 10. The position coordinate calculator 125 calculates coordinates of a point pointed by the device end of the pointing device 200 on the projection screen 10 based on the information measured by the pointing device 200 and received from the pointing device 200. Specifically, the position coordinate calculator 125 calculates coordinates of a point on the projection screen 10 pointed by the optical axis of the lens 251 of the pointing device 200.

The interactive communication unit 129 performs communication (i.e., transmission/reception) of information related to the interactive operation capability with the pointing device 200 and the information processing apparatus 300.

The operation information converter 127 converts the coordinates of the point pointed by the pointing device 200 on the projection screen 10 calculated by the position coordinate calculator 125, and a button status information of the pointing device 200 to an operation information used for operating the information processing apparatus 300. Then, the operation information converter 127 transmits the operation information to the information processing apparatus 300 via the interactive communication unit 129.

The device distance calculator 126 compares an actual postural change such as a swing angle of the pointing device 200 and the moved length of coordinates on the projection screen 10 pointed by the pointing device 200 with reference values of the swing angle and the moved length to calculate the distance between the pointing device 200 and the projection screen 10.

The device-action-reproducing determination unit 128 determines not to reproduce information of movement of the pointing device 200 that is not intended by a user on a projection image. For example, when the pointing device 200 is at a point far from the projection screen 10, the device-action-reproducing determination unit 128 determines not to reproduce information of detected micro movement of the pointing device 200 such as vibration or shaking not intended by a user on a projection image as a movement and an operation of a cursor.

(Pointing Device)

As illustrated in FIG. 5, the pointing device 200 includes, for example, an interactive communication unit 229, a positional information measurement unit 225, a moved-length calculator 226, and an angle calculator 227. The interactive communication unit 229 performs communication (i.e., transmission/reception) of information related to the interactive operation capability with the image projection apparatus 100. The positional information measurement unit 225 measures a pattern information embedded in an image projected on the projection screen 10 and pointed by the pointing device 200, and transmits the measured pattern information to the image projection apparatus 100 via the interactive communication unit 229. The moved-length calculator 226 integrates acceleration of the pointing device 200 detected by the accelerometer 270 to calculate actual moved length of the pointing device 200 per unit time. The angle calculator 227 integrates angular velocity detected by the angular velocity detector 280 to calculate actual swing angle of the pointing device 200 per unit time.

(Information Processing Apparatus)

As illustrated in FIG. 5, the information processing apparatus 300 includes, for example, an interactive communication unit 329, an operation unit 323, and an image output unit 322. The interactive communication unit 329 performs communication (i.e., transmission/reception) of information related to the interactive operation capability with the image projection apparatus 100. The operation unit 323 is used to operate the information processing apparatus 300 based on an operation to keys disposed for the information processing apparatus 300, and the operation information received from the image projection apparatus 100. The image output unit 322 outputs image data from the information processing apparatus 300 to an external display apparatus such as the image projection apparatus 100 and an external monitor.

Figure 6:
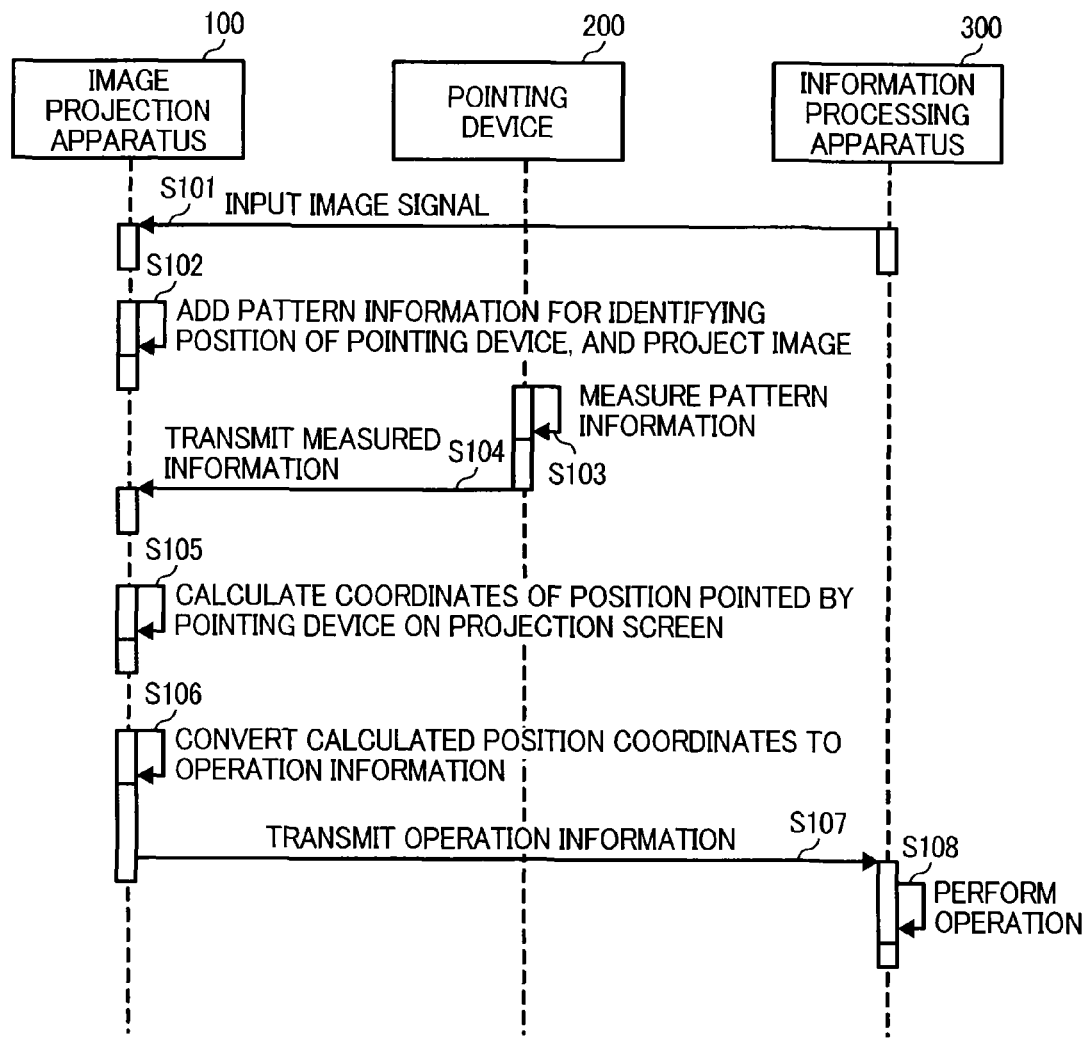
FIG. 6 is an example of an operational sequence of an interactive operation capability performable in the image projection system.

The above described image projection apparatus 100, the pointing device 200, and the information processing apparatus 300 can devise the interactive operation capability or interactive input-output capability as illustrated in an operational sequence of FIG. 6. FIG. 6 is an example of an operational sequence of the interactive operation capability performable in the image projection system 1.

When the information processing apparatus 300 is coupled or connected to the image projection apparatus 100 via the image cable 21 (e.g., HDMI) as illustrated in FIG. 1, the information processing apparatus 300 can input an image signal to the image projection apparatus 100 (S101). When the image projection apparatus 100 receives the image signal from the information processing apparatus 300 coupled or connected by the image cable 21 such as a HDMI cable, the image projection apparatus 100 adds a pattern information for identifying a position of the pointing device 200 to the image signal, and projects the image embedded with the pattern information (S102). The pointing device 200 measures coordinates of a point pointed by the pointing device 200 on the projection screen 10 operated by a user or operator (S103), and transmits the measured information and the operation information of the operation button to the image projection apparatus 100 (S104).

Based on the measured information received from the pointing device 200, the image projection apparatus 100 calculates coordinates of the point currently pointed by the pointing device 200, operated by the user, on the projection screen 10 (S105). Then, the image projection apparatus 100 converts the calculated coordinates of the point, and the operation information of the operation button of the pointing device 200 to the operation information of the information processing apparatus 300 (S106), and transmits the operation information to the information processing apparatus 300 (S107). Then, the information processing apparatus 300 performs an operation based on the operation information received by the information processing apparatus 300 such as a personal computer (S108). Specifically, the operation information received by the information processing apparatus 300 is reproduced in view of conditions at the information processing apparatus 300 as operations such as movement, click and touch of a mouse cursor. If the drawing capability of the information processing apparatus 300 is activated, images (e.g., line, character, text, and figure) can be drawn.

Figures 7, 8, 9:
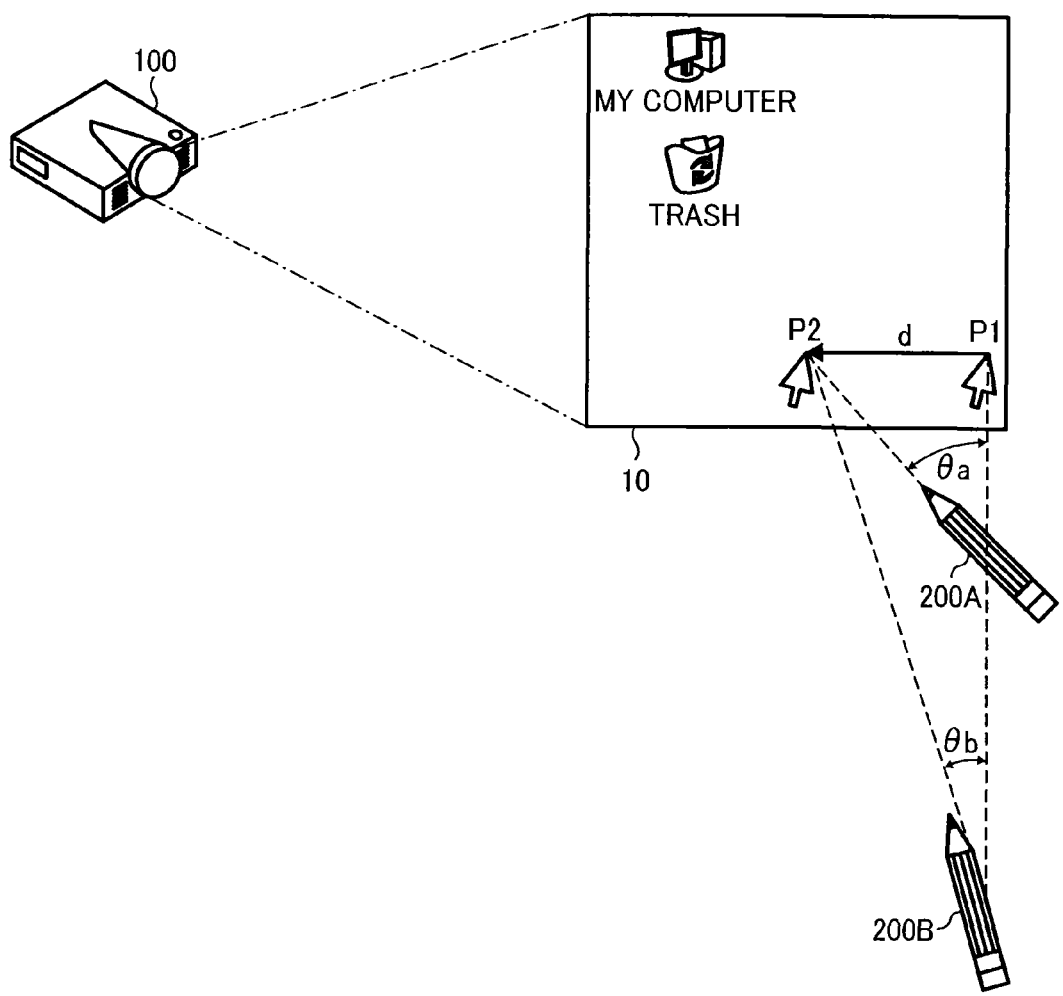
FIG. 7 illustrates an example operations of the pointing device operated at points near or far from the projection screen, in which coordinates of points on the projection screen pointed by the pointing device, and a postural change such as a swing angle of the pointing device change depending on the points of the pointing device is shown.
FIG. 8 is an example of a table setting data configuration for calculating distance between the pointing device and coordinates of points on the projection screen pointed by the pointing device.
FIG. 9 is an example of a table setting a data configuration used for determining whether movement of coordinates on the projection screen pointed by the pointing device is reproduced on the projection screen.

A description is given of operations on the image projection system 1 with reference to FIG. 7. FIG. 7 schematically illustrates operations of the pointing device 200 relative to the projection screen 10. As illustrated in FIG. 7, the pointing device 200 can be operated at a point near to the projection screen 10 or at a point far from the projection screen 10, in which coordinates of points on the projection screen 10 pointed by the pointing device 200, and postural change such as swing angles of the pointing device 200 are shown.

As illustrated in FIG. 7, when coordinates of two points P1 and P2 on the projection screen 10 are pointed by the pointing device 200 by operating the pointing device 200 without contacting the projection screen 10, the coordinates of the points move for a distance corresponding to a swing angle of the pointing device 200. Specifically, the farther the pointing device 200 from the projection screen 10, the smaller the swing angle of the pointing device 200 to move the same distance of coordinates on the projection screen 10 pointed by the pointing device 200.

Specifically, when the coordinates of points on the projection screen 10 pointed by the pointing device 200 are moved from the point P1 to the point P2 as indicated by a moved length "d" in FIG. 7, the swing angle of the pointing device 200 becomes an first swing angle "θa" when the pointing device 200A is operated at a first point relatively near to the projection screen 10, and the swing angle of the pointing device 200 becomes an second swing angle "θb" when the pointing device 200B is operated at a second point relatively far from the projection screen 10, in which the first swing angle "θa" is greater than the second swing angle "θb" (θa>θb). In other words, when the device end of the pointing device 200 swings for the same swing angle "θ," the farther the position of the pointing device 200 from the projection screen 10, the greater the moved length "d" of the coordinates of points on the projection screen 10 pointed or identified by the pointing device 200.

Therefore, the swing angle "θ" of the pointing device 200 corresponding to the movement operation by an user such as a swing operation, and the moved length "d" on the projection screen 10 are compared with reference values to calculate or determine the distance between the pointing device 200 and the coordinates of the point on the projection screen 10 pointed or identified by the pointing device 200.

FIG. 8 is an example of a table setting data configuration for calculating the distance between the pointing device 200 and coordinates of points on the projection screen 10 pointed by the pointing device 200. The table of FIG. 8 is configured with the movement of coordinates on the projection screen 10 pointed by the pointing device 200 expressed by pixel values, the corresponding actual swing angle of the device end of the pointing device 200, and the distance between the pointing device 200 and the projection screen 10 corresponding to each one of combinations of the movement of coordinates on the projection screen 10 and the swing angle of the device end of the pointing device 200.

The image projection apparatus 100 receives the swing angle of the pointing device 200 per unit time from the pointing device 200. Further, the image projection apparatus 100 receives information measured by the pointing device 200 from the pointing device 200, and calculates coordinates on the projection screen 10 based on the measured information to determine the movement of coordinates on the projection screen 10. Then, the information of the received swing angle of the pointing device 200 and the calculated movement of coordinates are compared with reference values set in the table to determine or calculate the distance between the pointing device 200 and the projection screen 10.

If a value of the moved length of the coordinates on the projection screen 10 pointed by the pointing device 200 does not match a reference value of the distance set in the table, a value closer to the calculated distance is selected. With this configuration, it can determine or calculate a point where the pointing device 200 exists in a space relative to the projection screen 10. Therefore, it can determine or calculate how far the position of the pointing device 200 is from the projection screen 10. When the device end of the pointing device 200 swings, the device distance calculator 126 compares the swing angle of the pointing device 200, and the moved length of coordinates of points on the projection screen 10 calculated by the position coordinate calculator 125 with the reference values set in the table to calculate the distance between the pointing device 200 and the projection screen 10. With this calculation, the following effect can be achieved.

For example, different from conventional image projection apparatuses such as a rear projection apparatus disposing a plurality of sensors near the projection screen to calculate the distance between the projection screen and the coordinate input device, the above described image projection apparatus of one or more example embodiments does not require a sensor on the projection screen. Therefore, a portable image projection apparatus that projects images on a projection face such as a screen or a wall of a room can be used without setting the sensor on the projection screen, with which a user's convenience of the image projection apparatus can be enhanced. Since the projection screen 10 can be assumed as a plane, the distance between the pointing device 200 and coordinates of the points on the projection screen 10 pointed by the pointing device 200 can be calculated by using one of values of X-axis and Y-axis (yaw and pitch for angle).

Then, based on the calculated distance between the pointing device 200 and the coordinates of the points on the projection screen 10 pointed by the pointing device 200, it is determined whether the movement of coordinates on the projection screen 10 pointed by the pointing device 200 is to be reproduced on the projection screen 10.

FIG. 9 is an example of a table that sets a data configuration used for determining whether the movement of coordinates on the projection screen 10 pointed by the pointing device 200 is reproduced on the projection screen 10. Specifically, the table sets smallest length (i.e., the smallest moved length) as a threshold to determine whether the movement of coordinates on the projection screen 10 pointed by the pointing device 200 is reproduced as an operation by the pointing device 200 on the projection screen 10. The table of FIG. 9 is configured with the smallest length of movement of coordinates on the projection screen 10 pointed by the pointing device 200 expressed by pixel values, and the distance between the pointing device 200 and the projection screen 10 corresponding to the smallest length. By referring the device-to-screen distance (i.e., distance between the pointing device 200 and coordinates of a point on the projection screen 10 pointed by the pointing device 200) with the table of FIG. 9, the smallest length expressed by the pixel value can be calculated.

Figure 10:
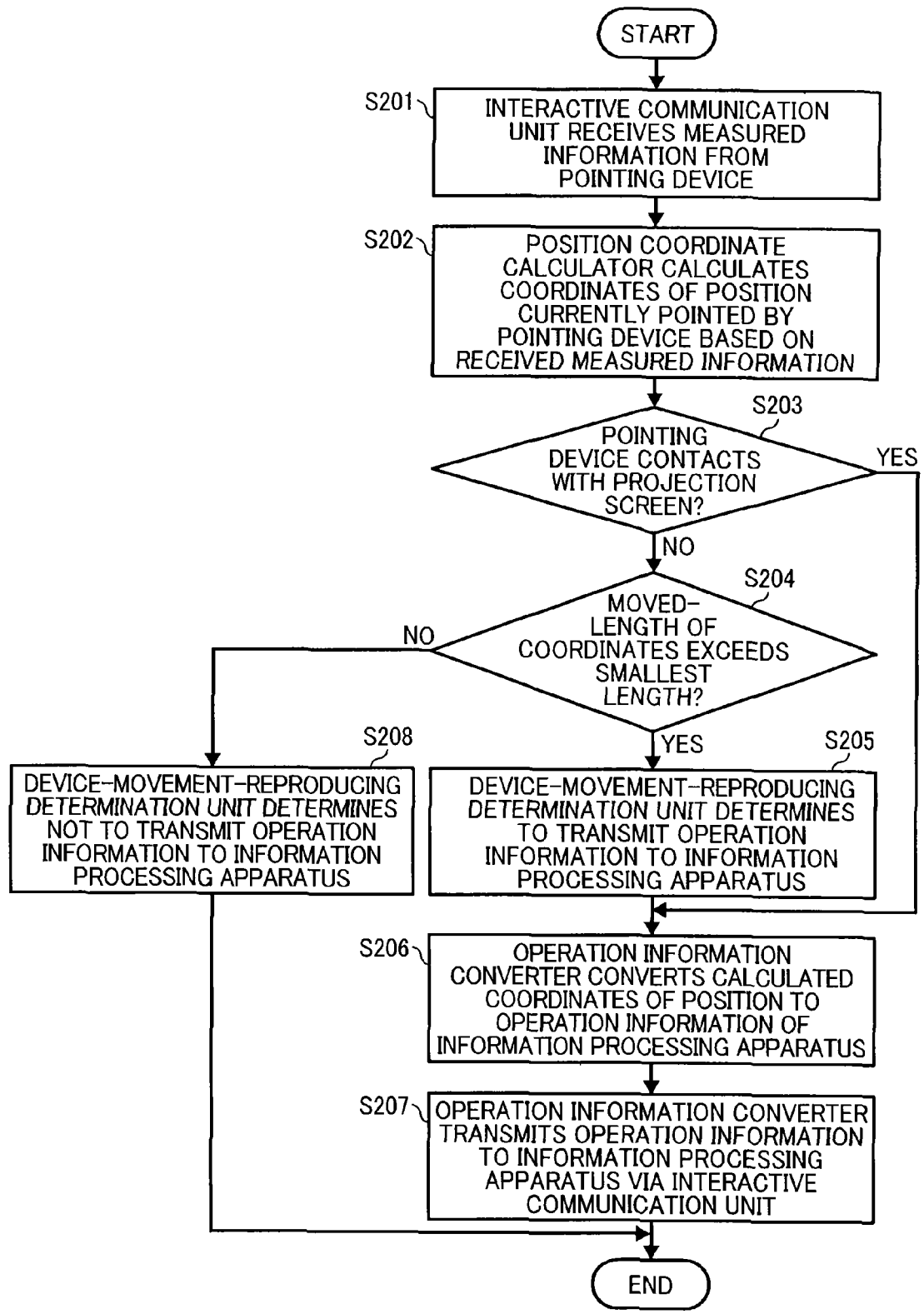
FIG. 10 is a flow chart showing the steps of determining whether the movement of coordinates on the projection screen pointed by the pointing device is reproduced when the pointing device is operated on or over the projection screen.

A description is given of a process of determining whether the movement of coordinates on the projection screen 10 pointed by the pointing device 200 is reproduced as an operation of the pointing device 200 when the pointing device 200 is operated on or over the projection screen 10 with reference to FIG. 10. FIG. 10 is a flow chart showing the steps of determining whether the movement of coordinates on the projection screen 10 pointed by the pointing device 200 is reproduced when the pointing device 200 is operated on or over the projection screen 10. When a user starts to operate the pointing device 200, the interactive communication unit 129 receives the measured information from the pointing device 200 (S201). Then, the position coordinate calculator 125 calculates coordinates of a point in a projection image currently pointed by the pointing device 200 on the projection screen 10 based on the received measured information (S202).

Then, based on the device-to-screen distance calculated by the device distance calculator 126, it is determined whether the pointing device 200 is being contacted with the projection screen 10 (S203).

If the pointing device 200 is being contacted with the projection screen 10 (S203: YES), the operation information converter 127 converts the calculated coordinates of the point to an operation information used for operating the information processing apparatus 300 (S206), and transmits the operation information to the information processing apparatus 300 via the interactive communication unit 129 (S207), with which an operation of the pointing device 200 can be reproduced on the information processing apparatus 300.

If it is determined that the pointing device 200 is not being contacted with the projection screen 10 (S203: NO), the device-action-reproducing determination unit 128 compares the coordinates of the point currently detected and the coordinates of the point previously detected to calculate the moved length of the coordinates, and determines whether the calculated moved length of coordinates exceeds the smallest length (S204).

If it is determined that the moved length of coordinates does not exceed the smallest length (i.e., less than the smallest length) (S204: NO), the device-action-reproducing determination unit 128 determines not to transmit the operation information to the information processing apparatus 300 (S208). If the operation information is not transmitted to the information processing apparatus 300, the movement of the pointing device 200 is not reproduced as an operation of the information processing apparatus 300. Therefore, even if the pointing device 200 is moved a little due to shaking of a hand not intended by a user, the movement of the pointing device 200 is not reproduced as the operation of the information processing apparatus 300.

By contrast, if it is determined that the moved length of coordinates exceeds the smallest length (S204: YES), the device-action-reproducing determination unit 128 determines to transmit the operation information to the information processing apparatus 300 (S205). Then, similar to the case that the pointing device 200 is being contacted with the projection screen 10 (S203: YES), the operation information converter 127 converts the calculated coordinates of the point to the operation information used for operating the information processing apparatus 300 (S206), and transmits the operation information to the information processing apparatus 300 via the interactive communication unit 129 (S207), with which the operation of the pointing device 200 can be reproduced on the information processing apparatus 300.

As above described, the device-action-reproducing determination unit 128 can be used to control a transmission of the operation information from the interactive communication unit 129 to the information processing apparatus 300. With this configuration, the coordinate input error which may occur when the pointing device 200 is operated without touching the projection screen 10 can be reduced. Therefore, when the image projection apparatus 100 and the pointing device 200 having the interactive operation capability are employed together, the coordinate input error which may occur when the pointing device 200 is operated without touching the projection screen 10 can be reduced.

Further, the movement of coordinates of point on the projection screen 10 pointed by the pointing device 200 such as a movement of a cursor projected on the projection screen 10 may occur when the device end of the pointing device 200 swings, and also when a user moves the pointing device 200 along X-axis direction or Y-axis direction on or over the projection screen 10. If the distance between the pointing device 200 and the projection screen 10 is calculated based on only the swing angle of the device end of the pointing device 20, the calculation error may become too great. Further, if the pointing device 200 is operated by regulating or limiting an operation range of the pointing device 200 to reduce the calculation error, a user may perform such regulated operation style for all of the time, with which operability and/or usability may deteriorate.

Therefore, the device distance calculator 126 of the image projection apparatus 100 is configured to calculate the distance between the pointing device 200 and the projection screen 10 by also considering the moved length of the pointing device 200 when the pointing device 200 is moved. Whit this configuration, when calculating the distance between the device end of the pointing device 200 and the projection screen 10 using the table of FIG. 8, the movement of coordinates on the projection screen 10 can be corrected. With this correction process, the postural change of the coordinate input device 200 and the corrected moved length of coordinates are compared with the table of FIG. 8, with which the calculation error can be reduced, and the operability and/or usability can be enhanced.

A description is given a process of calculating the distance between the pointing device 200 and the projection screen 10 by also considering the moved length of the pointing device 200 with reference to FIG. 11. FIG. 11 is a flow chart showing the steps of calculating the distance between the pointing device 200 and the projection screen 10 by using the device distance calculator 126 based on the postural change of the pointing device 200 and the moved length of the pointing device 200.

When a user starts to operate the pointing device 200, the image projection apparatus 100 starts to receive the moved length of the pointing device 200 from the pointing device 200 with a given time interval (Start). Then, the image projection apparatus 100 determines whether the received moved length of pointing device 200 is greater than zero (S301). If the moved length of the pointing device 200 is zero (S301: NO), the device distance calculator 126 does not correct the movement of coordinates on the projection screen 10, but calculates or determines the distance between the pointing device 200 and the projection screen 10 (S304) without the correction process. Therefore, if the received moved length of the pointing device 200 is zero, the device distance calculator 126 does not correct the movement of coordinates on the projection screen 10, but compares the actual swing angle of the device end of the pointing device 200 and the actual movement of coordinates of the device end of the pointing device 200 with the swing angle and the movement of coordinates stored in the table of FIG. 8 to calculate or determine the device-to-screen distance.

By contrast, if the moved length is greater than zero (S301: YES), the device distance calculator 126 corrects the movement of coordinates on the projection screen 10 based on coordinates corresponding to the moved length of the pointing device 200 (S302). Specifically, the movement of coordinates (moved length of coordinates) on the projection screen 10 can be set as a length per one pixel such as 1 pixel=1 mm, and corrects a value of the movement of coordinates using this setting. For example, when coordinates of a point on the projection screen 10 pointed by the device end of the pointing device 200 moves for 18 pixels in X-axis direction, and the pointing device 200 moves actually 3 mm in X-axis direction, the corrected movement of coordinates becomes 18−1×3=15 pixels. Then, the corrected movement of coordinates on the projection screen 10 and the swing angle of the device end of the pointing device 200 are compared with the table of FIG. 8, and then the device distance calculator 126 calculates the distance between the pointing device 200 and the projection screen 10 (S303).

Further, as to the device-action-reproducing determination unit 128 of the image projection apparatus 100, the smallest length for re-producing operations of the pointing device 200 on the projection screen 10 can be set for each one of users that use the interactive operational system. With this configuration, the smallest moved length of coordinates of point on the projection screen 10 for re-producing the operation of the pointing device 200 on the projection screen 10 can be differently depending on operation styles of different users. Therefore, the pointing device 200 can be operated further effectively, and the operability and/or usability can be further enhanced for each of users that may operate the pointing device 200 with different operation styles.

A description is given of a method of setting the smallest length for different users with reference to FIG. 12. FIG. 12 is an example of a table having a data configuration that sets the smallest length for re-producing an operation of the pointing device 200 for one user. The table of FIG. 9 can pre-set a value for the smallest length (the smallest moved length) depending on the distance between the device end of the pointing device 200 and the projection screen 10. By contrast, as to the table of FIG. 12, the values of the smallest length stored in the row of the smallest length, indicated by a bold line in FIG. 12, can be set for each of different users.

Further, the optimal smallest moved length becomes different whether the pointing device 200 is in an instruction mode or a writing mode. Therefore, the device-action-reproducing determination unit 128 of the image projection apparatus 100 is configured to set the smallest length for the coordinates of points, input by the pointing device 200 on the projection screen 10, used for re-producing operations of the pointing device 200 on the projection screen 10 as described below. Specifically, the smallest length for re-producing the operations of the pointing device 200 on the projection screen 10 can be set differently when the pointing device 200 is in the instruction mode that operates the information processing apparatus 30, and when the pointing device 200 is in the writing mode that performs drawing and writing on the projection screen 10 by using the information processing apparatus 300.

By setting the smallest length for re-producing the operations of the pointing device 200 on the projection screen 10 differently whether the pointing device 200 is in the instruction mode or the writing mode, the optimal movement of the pointing device 200 can be set for a user that operates the pointing device 200, and thereby the capability of the interactive operational system of the image projection system 1 can be enhanced.

A description is given of another method of setting the smallest length with reference to FIG. 13. FIG. 13 is an example of a table having data configuration that sets the smallest length differently whether the pointing device 200 is in the instruction mode or the writing mode. The table of FIG. 13 sets different values for the smallest length in a row of the smallest length for the instruction mode and the writing mode of the pointing device 200 operable by a user.

The smallest length is set differently for the instruction mode and the writing mode due to the following reason. When a user performs the writing by using the pointing device 200 (i.e., writing mode), the user is drawing images (e.g., line, character, text, figure) on the projection screen 10. Therefore, if a tiny movement of the pointing device 200 is reproduced, unclear and not-sharp images are generated. By contrast, when the user operates the information processing apparatus 300 by using the pointing device 200 (i.e., instruction mode) similar to an operation of a mouse cursor, reproducing of tiny movement of the pointing device 200 may not cause problems compared to the writing mode.

Figures 14, 15:
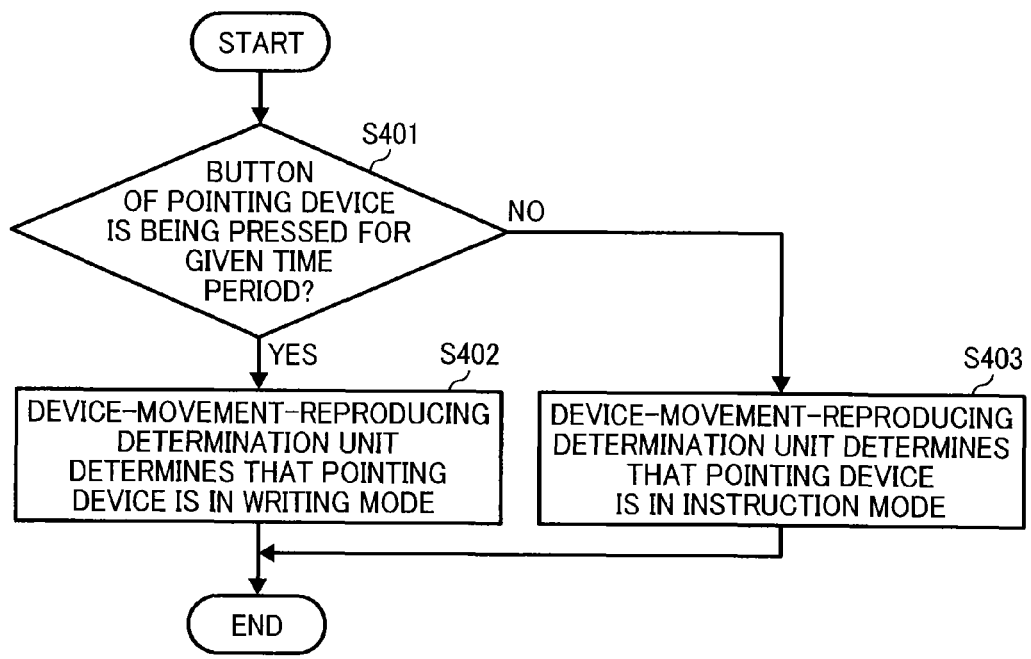
FIG. 14 is a flow chart showing the steps of determining an activated mode of the pointing device by a user.
FIG. 15 is an example setting a plurality of tables for calculating distance between the pointing device and coordinates of a point on the projection screen pointed by the pointing device for each of screen sizes used by the image projection apparatus.

A description is given of a process of determining whether the pointing device 200 is in the writing mode or the instruction mode with reference to FIG. 14. FIG. 14 is a flow chart showing the steps of determining an activated mode of the pointing device 200 by a user. When the user is performing the writing to the projection screen 10 by using the pointing device 200 (i.e., writing mode), it is assumed that at least one of operation buttons of the pointing device 200 is being pressed for a given time period or more. Therefore, if the operation button of the pointing device 200 is being pressed for the given time period or more, it can be determined that the pointing device 200 is in the writing mode, and if the operation button of the pointing device 200 is not being pressed for the given time period or more, it can be determined that the pointing device 200 is in the instruction mode.

When a user starts to operate the pointing device 200, the image projection apparatus 100 starts to receive the moved length of the pointing device 200 from the pointing device 200 with a given time interval (Start). Then, the image projection apparatus 100 determines whether the operation button of the pointing device 200 is being pressed for a given time period or more (S401). If the operation button is not being pressed for the given time period (S401: NO), the device-action-reproducing determination unit 128 determines that the pointing device 200 is in the instruction mode (S403). By contrast, if the operation button is being pressed for the given time period or more (S401: YES), the device-action-reproducing determination unit 128 determines that the pointing device 200 is in the writing mode (S402).

Further, the image projection apparatus 100 can be devised as a portable apparatus that can project image on a screen and a wall of a room, in which a screen size for projecting images varies. As to the image projection apparatus 100 having the interactive operational system, the relationship of postural change of the pointing device 200 and movement of coordinates of the projection screen 10 varies depending on the screen size. Therefore, the device-action-reproducing determination unit 128 of the image projection apparatus 100 can be configured to calculate the distance between the device end of the pointing device 200 and the projection screen 10 in view of the screen size.

With this configuration, the following effect can be achieved. Specifically, this configuration can calculate the distance between the device end of the pointing device 200 and the projection screen 10 in view of the screen size by the image projection apparatus 100, and the coordinate input error, which may occur when the pointing device 200 is operated without touching the projection screen 10, can be reduced for any of the screen sizes. Therefore, the operability and/or usability of the interactive input-output system can be enhanced.

A description is given of an example configuration that the device-action-reproducing determination unit 128 of the image projection apparatus 100 determines whether the movement of coordinates of points on the projection screen 10 pointed by the device end of the pointing device 200 is reproduced on the projection screen 10 with reference to FIG. 15. FIG. 15 is an example of a plurality of tables used for calculating the distance between the pointing device 200 and coordinates of a point on the projection screen 10 pointed by the pointing device 200 for each of screen sizes used by the image projection apparatus 100.

As illustrated in FIG. 15, the device-action-reproducing determination unit 128 of the image projection apparatus 100 prepares or generates the tables for each of the screen sizes to calculate the distance between the pointing device 200 and coordinates of a point on the projection screen 10 pointed by the pointing device 200. For example, a user inputs a screen size, and the device-action-reproducing determination unit 128 uses a table corresponding to the input screen size to calculate the distance between the pointing device 200 and the projection screen 10 with enhanced precision.

In the above described example embodiments, the image projection apparatus 100 devised as a portable apparatus that can project image on a screen and a wall of a room, and the image projection apparatus 100, the pointing device 200, and the information processing apparatus 300 are employed to configure the image projection system 1, but the present invention is not limited to such configuration. For example, instead of the pointing device 200, the coordinate input device can employ a pointing rod and a pointer. Further, in the above described example embodiments, the image projection system 1 employs the pointing device 200 that can measure a pattern information embedded in a projection image projected on the projection screen 10, and input coordinates of a point on the projection screen 10, but the present invention is not limited to such configuration. For example, a coordinate input device that can input coordinates of a point on the projection screen 10 using other methods can be employed for the image projection system 1. The present invention can be applied to various image projection apparatuses, image projection systems, and interactive input-output systems within the scope of the present invention.

The above described example embodiments can be configured, for example, as below.

(Configuration A)

The above described image projection apparatus 100 is configurable with the coordinate input device such as the pointing device 200 and the external apparatus such as the information processing apparatus 300, in which each having interactive input-output capability. The image projection apparatus 100 includes an image receiver 121 to receive an image signal; an image processor 124 to convert the image signal received by the image receiver 121 to a projection signal; a projection unit 122 to project a projection image on a projection screen 10 using the projection signal; a coordinate calculator 125 to calculate coordinates of a point such as the points P1 and P2 in the projection image on the projection screen 10 when the point is identified by a coordinate input device 200 and information of coordinates of the identified point is input from the coordinate input device 200 to the image projection apparatus 100; an interactive communication unit 129 to perform communication of information related to the interactive input-output capability with the coordinate input device, and the external apparatus that outputs the image signal to the image receiver 121; an operation information converter 127 to convert the coordinates of the point calculated by the coordinate calculator 125 and an operation information of the operation button of the coordinate input device 200 to an operation information used for any one of the image projection apparatus 100 and the external apparatus; a distance calculator 126 to calculate distance between the coordinate input device and the projection screen; and an input-action-reproducing determination unit to determine whether movement of coordinates of point on the projection screen identified by the coordinate input device is to be reproduced on the projection screen 10 depending on the distance calculated by the distance calculator 126.

With employing this configuration, as above described in the example embodiments, the following effect can be achieved. When the coordinate input device is operated without contacting the projection screen 10, the coordinate input error may occur due to the postural change (swing angle) and movement of the coordinate input device caused by shaking of a hand not intended by the user, with which the calculation error of the distance between the coordinate input device and the projection screen 10 may become greater. Therefore, based on the distance calculated by the distance calculator 126, it is determined whether the movement of the coordinates identified by the coordinate input device on the projection screen 10 is to be reproduced as a movement and operation of a cursor, with which the coordinate input error caused by shaking of a hand not intended by the user can be reduced.

Specifically, when coordinates of points on the projection screen 10 are moved by operating the coordinate input device, the length of two points on the projection screen 10 can be calculated by using the coordinate calculator 125, and the smallest length (smallest moved length) of the moved coordinates on the projection screen 10 for determining whether an operation of the coordinate input device is set, in which the longer the distance between the coordinate input device and the projection screen 10 calculated by the distance calculator 126, the smallest length (smallest moved length) of the moved coordinates on the projection screen 10 is set greater. Then, when the coordinate input device is operated without touching the projection screen 10, if it is determined that the moved length of coordinates does not exceed the smallest length (less than the smallest length), the device-action-reproducing determination unit 128 determines not to transmit the operation information to the information processing apparatus 300 used as the external apparatus. If the operation information is not transmitted to the information processing apparatus 300, the movement of the pointing device 200 is not reproduced as the operation of the information processing apparatus 300. Therefore, even if the pointing device 200 is moved a little due to shaking of a hand not intended by a user, the movement of the pointing device 200 is not reproduced as the operation of the information processing apparatus 300.

By contrast, if it is determined that the moved length of coordinates exceeds the smallest length, the device-action-reproducing determination unit 128 determines to transmit the operation information to the information processing apparatus 300. Then, the operation information converter 127 converts the calculated coordinates of the point to the operation information of the information processing apparatus 300, and transmits the operation information to the information processing apparatus 300 by using the interactive communication unit 129, with which the operation of the pointing device 200 is reproduced to the information processing apparatus 300.

As above described, the device-action-reproducing determination unit 128 can be used to control a transmission of the operation information from the interactive communication unit 129 to the information processing apparatus 300. With this configuration, the coordinate input error which may occur when the pointing device 200 is operated without touching the projection screen 10 can be reduced. Therefore, when the image projection apparatus 100 and the pointing device 200 having the interactive operation capability are used together, the coordinate input error which may occur when the pointing device 200 is operated without touching the projection screen 10 can be reduced.

(Configuration B)

As to configuration A, when postural change of the pointing device 200 such as a change of inclination of the device end occurs, the device distance calculator 126 compares the postural change of the pointing device 200 such as the swing angle of the pointing device 200, and the moved length (movement range) of coordinates on the projection screen 10 calculated by the coordinate calculator such as the position coordinate calculator 125 with reference values to calculate the distance between the coordinate input device such as the pointing device 200 and the projection screen 10.

With employing this configuration, as above described in the example embodiments, the following effect can be achieved. For example, different from conventional image projection apparatuses such as a rear projection apparatus disposing a plurality of sensors near the projection screen 10 to calculate the distance between the projection screen and the coordinate input device, the above described image projection apparatus of one or more example embodiments does not require a sensor on the projection screen 10. Therefore, a portable image projection apparatus that projects images on a projection face such as a screen or a wall of a room can be used without setting the sensor on the projection face screen, with which a user's convenience of the image projection apparatus can be enhanced because the attachment work of the sensor on the projection screen 10 side can be omitted.

(Configuration C)

As to configuration B, the distance calculator 126 calculates the distance between the coordinate input device such as the pointing device 200 and the projection screen 10 when the coordinate input device (200) is moved by also considering the moved length of the coordinate input device.

With employing this configuration, as above described in the example embodiments, the following effect can be achieved. The movement of coordinates of point on the projection screen 10 pointed by the pointing device 200 such as a movement of a cursor projected on the projection screen 10 may occur when the device end of the pointing device 200 swings, and also when a user moves the pointing device 200 along X-axis direction or Y-axis direction on or over the projection screen 10. If the distance between the pointing device 200 and the projection screen 10 is calculated based on only the swing angle of the device end of the pointing device 20, the calculation error may become too great. Further, if the pointing device 200 is operated by limiting an operation range of the pointing device 200 to reduce the calculation error, a user may perform such regulated operation style for all of the time, with which operability and/or usability may deteriorate.

Therefore, the device distance calculator 126 of the image projection apparatus 100 is configured to calculate the distance between the coordinate input device such as the pointing device 200 and the projection screen 10 by also including the moved length of the pointing device 200 to the postural change of the pointing device 200 when the pointing device 200 is moved. With this configuration, when calculating the distance between the device end of the pointing device 200 and the projection screen 10 using the table of FIG. 8, the movement of coordinates on the projection screen 10 can be corrected. With this correction process, the postural change of the coordinate input device 200 and the corrected moved length of coordinates are compared with the table of FIG. 8, with which the calculation error can be reduced, and a user operability and/or usability can be enhanced.

(Configuration D)

The above described system employing an interactive input-output capability (100, 200, 300) includes the image projection apparatus 100 to project an projection image such as still and movie image with or without audio on the projection screen; the coordinate input device such as the pointing device 200 to input coordinates of a point in the projection image projected on the projection screen by the image projection apparatus; the external apparatus such as the information processing apparatus 300 to output an image signal used for generating the projection image projected by the image projection apparatus 100.

The image projection apparatus 100 includes an interactive input-output capability to operate the external apparatus based on the coordinates of the point pointed by the coordinate input device contacting the projection screen or pointed by the coordinate input device not contacting the projection screen.

The coordinate input device (200) includes the interactive communication unit 229 to perform communication of information related to the interactive input-output capability with the image projection apparatus 100; the positional information measurement unit 225 to measure a pattern information embedded in the projection image by using the coordinate input device 200, and transmit the measured information to the image projection apparatus 100 via the interactive communication unit 229; the moved length calculator 226 to calculate a moved length of the coordinate input device (200) based on acceleration occurred by an operational movement of the coordinate input device 200; and the angle calculator 227 to calculate a swing angle of the coordinate input device based on an angular velocity occurred by a postural change of the coordinate input device.

Tithe external apparatus (300) includes the interactive communication unit 32) to perform communication of information related to the interactive input-output capability with the image projection apparatus 100; the image output unit 322 to output an image signal to the image projection apparatus 100 and a display disposed for the external apparatus 300; and the operation unit 323 to perform an operation on the external apparatus 300 based on the operation information received via the interactive communication unit 329.

With employing this configuration, as above described in the example embodiments, the coordinate input error which may occur when the pointing device 200 is operated without touching the projection screen 10 can be reduced. Therefore, when the image projection apparatus 100, the pointing device 200 and the information processing apparatus 300 having the interactive operation capability are employed together as the interactive input-output system (100, 200, 300), the coordinate input error which may occur when the pointing device 200 is operated without touching the projection screen 10 can be reduced.

(Configuration E)

A to configuration D, the device-action-reproducing determination unit 128 of the image projection apparatus 100, the smallest length (smallest moved length) for reproducing operations of the coordinate input device such as the pointing device 200 on the projection screen 10 can be set for each one of users that use the interactive operational system or the interactive input-output system (100, 200, 300), in which a user can set he smallest length.

With employing this configuration, as above described in the example embodiments, the following effect can be achieved. Specifically, the smallest moved length of coordinates of point on the projection screen 10 for reproducing the operation of the pointing device 200 on the projection screen 10 can be set each of users depending on operation styles of each one of the users. Therefore, the pointing device 200 can be operated further effectively, and the operability and/or usability can be further enhanced for each of users that operate the pointing device 200 with differently operation styles.

(Configuration F)

As to the configurations D or E, the device-action-reproducing determination unit 128 of the image projection apparatus 100 sets the smallest length (smallest moved length) of coordinates of points, input by the coordinate input device such as the pointing device 200, on the projection screen 10 used for re-producing the movement of coordinates on the projection screen 10 differently whether the coordinate input device is in the instruction mode that operates the external apparatus such as the information processing apparatus 300 or the writing mode that performs drawing and writing on the projection screen 10 by using the external apparatus.

With employing this configuration, as above described in the example embodiments, the following effect can be achieved. The optimal smallest moved length differs whether the coordinate input device is in the instruction mode or the writing mode. Therefore, by setting the smallest length for reproducing the operations of the pointing device 200 on the projection screen 10 differently whether the pointing device 200 is in the instruction mode or the writing mode, the optimal movement of the pointing device 200 can be set for a user that operates the pointing device 200, and thereby the capability of the interactive operational system of the image projection system 1 can be enhanced.

(Configuration G)

As to any one of the configurations D to F, the device-action-reproducing determination unit 128 of the image projection apparatus 100 can be used with the distance calculator 126 when the distance calculator 126 calculates the distance between the coordinate input device such as the pointing device 200 and the projection screen 10 in view of the screen size to be projected on the projection screen 10.

With employing this configuration, as above described in the example embodiments, the following effect can be achieved. Specifically, this configuration can calculate the distance between the device end of the pointing device 200 and the projection screen 10 in view of the screen size used by the image projection apparatus 100, and the coordinate input error, which may occur when the pointing device 200 is operated without touching the projection screen 10, can be reduced for any screen sizes. Therefore, the operability and/or usability of the interactive input-output system can be enhanced.

As to the above described image projection apparatus and the coordinate input device having interactive input-output capability of the example embodiments of the present invention, the coordinate input error which may occur when the coordinate input device is operated over the projection screen without touching a plane such as a screen can be reduced, in particular prevented.

The present invention can be implemented in any convenient form, for example using dedicated hardware platform, or a mixture of dedicated hardware platform and software. Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions. For example, in some embodiments, any one of the information processing apparatus may include a plurality of computing devices, e.g., a server cluster, that are configured to communicate with each other over any type of communication links, including a network, a shared memory, etc. to collectively perform the processes disclosed herein.

The computer software can be provided to the programmable device using any carrier medium or storage medium such as non-volatile memory for storing processor-readable code such as a floppy disk, a flexible disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EE-PROM), erasable programmable read only memory (EPROM), a memory card or stick such as USB memory, a memory chip, a mini disk (MD), a magneto optical disc (MO), magnetic tape, a hard disk in a server, a flash memory, Blu-ray disc (registered trademark), secure digital (SD) card, a solid state memory device or the like, but not limited these. Further, the computer software can be provided through communication lines such as electrical communication line. Further, the computer software can be provided in a read only memory (ROM) disposed for the computer. The computer software stored in the storage medium can be installed to the computer and executed to implement the above described processing. The computer software stored in the storage medium of an external apparatus can be downloaded and installed to the computer via a network to implement the above described processing.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C, C++, C#, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image projection system, comprising:
an image projection apparatus to receive input image data from an external apparatus; and
a coordinate input device communicably connected to the image projection apparatus, wherein the coordinate input device includes first processing circuitry to acquire measurement information from a projection screen pointed to by the coordinate input device,
wherein the image projection apparatus includes second processing circuitry configured to
calculate coordinates of a point on the projection screen pointed to by one end of the coordinate input device, based on the measurement information obtained from the coordinate input device;
calculate a distance between the coordinate input device and the coordinates of the point on the projection screen; and
determine whether a movement of the coordinates of the point on the projection screen pointed to by the coordinate input device is to be reproduced on the projection screen, depending on the calculated distance between the coordinate input device and the coordinates of the point on the projection screen.

2. The image projection system of claim 1, wherein the first processing circuitry measures the coordinates of the point based on pattern information embedded on the projection screen pointed to by the coordinate input device.

3. The image projection system of claim 1, wherein
the first processing circuitry is further configured to:
calculate a moved length of the coordinate input device, and
calculate a swing angle of the coordinate input device; and
the second processing circuitry is further configured to
calculate a moved length of the coordinates of the point on the projection screen from the measurement information, and
calculate the distance between the coordinate input device and the coordinates of the point on the projection screen based on (i) the calculated swing angle of the coordinate input device, (ii) the calculated moved length of the coordinates of the point on the projection screen, and (iii) the calculated moved length of the coordinate input device.

4. The image projection system of claim 3, wherein the second processing circuitry is further configured to
correct the moved length of the coordinates of the point on the projection screen based on the calculated moved length of the coordinate input device to generate a corrected moved length of the coordinates of the point on the projection screen, and
calculate the distance between the coordinate input device and the coordinates of the point on the projection screen based on the corrected moved length of the coordinates of the point on the projection screen and the calculated swing angle of the coordinate input device.

5. The image projection system of claim 4, wherein the second processing circuitry is further configured to correct the moved length of the coordinates of the point on the projection screen based on the calculated moved length of the coordinate input device to generate a corrected moved length of the coordinates of the point on the projection screen, only when the calculated moved length of the coordinate input device is greater than zero.

6. The image projection system of claim 3, wherein the second processing circuitry is further configured to
convert the calculated coordinates of the point to operation information used for an operation of the external apparatus; and
transmit the operational information to the external apparatus, when the calculated moved length of the coordinates of the point on the projection screen exceeds a predetermined threshold.

7. The image projection system of claim 1, wherein the image projection apparatus includes a projector to project a projection image onto the projection screen; and
the image projection system further comprises the external apparatus, which is configured to output an image signal used to generate the projection image projected by the projector.

8. An image projection apparatus, comprising:

a projector to project a projection image onto a projection screen based on received image data; and processing circuitry configured to receive the input image data from an external apparatus;

calculate coordinates of a point on the projection screen pointed to by one end of a coordinate input device, based on the measurement information obtained from the coordinate input device, the coordinate input device being communicably connected to the image projection apparatus;

calculate a distance between the coordinate input device and the coordinates of the point on the projection screen; and determine whether a movement of the coordinates of the point on the projection screen pointed to by the coordinate input device is to be reproduced on the projection screen, depending on the calculated distance between the coordinate input device and the coordinates of the point on the projection screen.

9. A method, comprising:

receive input image data from an external apparatus;

project a projection image onto a projection screen based on the input image data;

calculate coordinates of a point on the projection screen pointed to by one end of a coordinate input device, based on the measurement information obtained from the coordinate input device, the coordinate input device being communicably connected to the image projection apparatus;

calculate a distance between the coordinate input device and the coordinates of the point on the projection screen; and determine whether a movement of the coordinates of the point on the projection screen pointed to by the coordinate input device is to be reproduced on the projection screen, depending on the calculated distance between the coordinate input device and the coordinates of the point on the projection screen.

10. The method of claim 9, wherein the step of calculating the distance comprises:

calculating a moved length of the coordinates of the point on the projection screen from the measurement information, and calculating the distance between the coordinate input device and the coordinates of the point on the projection screen based on (i) a calculated swing angle of the coordinate input device, (ii) the calculated moved length of the coordinates of the point on the projection screen, and (iii) a calculated moved length of the coordinate input device.

11. The method of claim 10, wherein the step of calculating the distance further comprises:

correcting the moved length of the coordinates of the point on the projection screen based on the calculated moved length of the coordinate input device to generate a corrected moved length of the coordinates of the point on the projection screen, and calculating the distance between the coordinate input device and the coordinates of the point on the projection screen based on the corrected moved length of the coordinates of the point on the projection screen and the calculated swing angle of the coordinate input device.

12. The method of claim 9, further comprising:

converting the calculated coordinates of the point to operation information used for an operation of the external apparatus; and transmitting the operational information to the external apparatus, when the calculated moved length of the coordinates of the point on the projection screen exceeds a predetermined threshold.

\* \* \* \* \*